United States Patent
Black

(10) Patent No.: US 11,929,822 B2
(45) Date of Patent: Mar. 12, 2024

(54) MULTIPATH REPEATER SYSTEMS

(71) Applicant: Pivotal Commware, Inc., Kirkland, WA (US)

(72) Inventor: Eric James Black, Bothell, WA (US)

(73) Assignee: Pivotal Commware, Inc., Bothell, WA (US)

( * ) Notice: Subject to any disclaimer, the term of this patent is extended or adjusted under 35 U.S.C. 154(b) by 0 days.

(21) Appl. No.: 17/859,632

(22) Filed: Jul. 7, 2022

(65) Prior Publication Data

US 2023/0011531 A1 Jan. 12, 2023

Related U.S. Application Data

(60) Provisional application No. 63/219,318, filed on Jul. 7, 2021.

(51) Int. Cl.
*H04B 7/204* (2006.01)
*H04B 7/0413* (2017.01)
*H04B 7/155* (2006.01)

(52) U.S. Cl.
CPC ......... *H04B 7/2041* (2013.01); *H04B 7/0413* (2013.01); *H04B 7/15592* (2013.01)

(58) Field of Classification Search
None
See application file for complete search history.

(56) References Cited

U.S. PATENT DOCUMENTS

| | | | |
|---|---|---|---|
| 2,131,108 A | 9/1938 | Lindenblad | |
| 4,464,663 A | 8/1984 | Lalezari et al. | |
| 6,133,880 A | 10/2000 | Grangeat et al. | |
| 6,150,987 A | 11/2000 | Sole et al. | |
| 6,529,745 B1 | 3/2003 | Fukagawa et al. | |
| 6,680,923 B1 | 1/2004 | Leon | |
| 7,084,815 B2 | 8/2006 | Phillips et al. | |
| 7,205,949 B2 | 4/2007 | Turner | |
| 8,711,989 B1 * | 4/2014 | Lee | H04L 25/03891 375/349 |
| 9,356,356 B2 | 5/2016 | Chang et al. | |

(Continued)

FOREIGN PATENT DOCUMENTS

| | | |
|---|---|---|
| AU | 2019239864 B2 | 2/2023 |
| AU | 2020226298 A1 | 2/2023 |

(Continued)

OTHER PUBLICATIONS

Office Communication for U.S. Appl. No. 15/925,612 dated Jun. 15, 2018, pp. 1-9.

(Continued)

*Primary Examiner* — Shripal K Khajuria
(74) *Attorney, Agent, or Firm* — John W. Branch; Branch Partners PLLC

(57) ABSTRACT

A wireless communication network such as a 5G communication network can use MIMO technologies to enhance bandwidth between a wireless communications base station and one or more user equipment devices within a service area of the base station. RF signal repeaters can be utilized to provide one or more additional physical channels for communication between the MIMO base station and the MIMO user equipment. These RF signal repeaters can be regarded as increasing the MIMO channel diversity within the ambient environment.

22 Claims, 4 Drawing Sheets

(56) References Cited

U.S. PATENT DOCUMENTS

| | | |
|---|---|---|
| 9,385,435 B2 | 7/2016 | Bily et al. |
| 9,450,310 B2 | 9/2016 | Bily et al. |
| 9,551,785 B1 | 1/2017 | Geer |
| 9,608,314 B1 | 3/2017 | Kwon et al. |
| 9,635,456 B2 | 4/2017 | Fenichel |
| 9,711,852 B2 | 7/2017 | Chen et al. |
| 9,806,414 B2 | 10/2017 | Chen et al. |
| 9,806,415 B2 | 10/2017 | Chen et al. |
| 9,806,416 B2 | 10/2017 | Chen et al. |
| 9,812,779 B2 | 11/2017 | Chen et al. |
| 9,813,141 B1 | 11/2017 | Marupaduga et al. |
| 9,936,365 B1 | 4/2018 | Elam |
| 9,955,301 B1 | 4/2018 | Markhovsky et al. |
| 10,014,948 B2 | 7/2018 | Ashrafi |
| 10,020,891 B2 | 7/2018 | Ashrafi |
| 10,033,109 B1 | 7/2018 | Gummalla et al. |
| 10,153,845 B2 | 12/2018 | Ashrafi |
| 10,187,156 B2 | 1/2019 | Ashrafi |
| 10,225,760 B1 | 3/2019 | Black |
| 10,277,338 B2 | 4/2019 | Reial et al. |
| 10,313,894 B1 | 6/2019 | Desclos et al. |
| 10,324,158 B2 | 6/2019 | Wang et al. |
| 10,326,203 B1 | 6/2019 | Black et al. |
| 10,333,217 B1 | 6/2019 | Black et al. |
| 10,374,710 B2 | 8/2019 | Ashrafi |
| 10,425,905 B1 | 9/2019 | Black et al. |
| 10,431,899 B2 | 10/2019 | Bily et al. |
| 10,468,767 B1 | 11/2019 | McCandless et al. |
| 10,491,303 B2 | 11/2019 | Ashrafi |
| 10,505,620 B2 | 12/2019 | Ito et al. |
| 10,522,897 B1 | 12/2019 | Katko et al. |
| 10,524,154 B2 | 12/2019 | Black |
| 10,524,216 B1 | 12/2019 | Black et al. |
| 10,547,386 B2 | 1/2020 | Ashrafi |
| 10,594,033 B1 | 3/2020 | Black et al. |
| 10,673,646 B1 | 6/2020 | Shinar et al. |
| 10,734,736 B1 | 8/2020 | McCandless et al. |
| 10,862,545 B2 | 12/2020 | Deutsch et al. |
| 10,863,458 B2 | 12/2020 | Black et al. |
| 10,971,813 B2 | 4/2021 | McCandless et al. |
| 10,998,642 B1 | 5/2021 | McCandless et al. |
| 11,026,055 B1 | 6/2021 | Rea |
| 11,069,975 B1 | 7/2021 | Mason et al. |
| 11,088,433 B2 | 8/2021 | Katko et al. |
| 11,190,266 B1 | 11/2021 | Black et al. |
| 11,252,731 B1 | 2/2022 | Levitsky et al. |
| 11,279,480 B1 | 3/2022 | Rezvani |
| 11,297,606 B2 | 4/2022 | Machado et al. |
| 11,374,624 B2 | 6/2022 | Deutsch et al. |
| 11,424,815 B2 | 8/2022 | Black et al. |
| 11,431,382 B2 | 8/2022 | Deutsch et al. |
| 11,451,287 B1 | 9/2022 | Sivaprakasam et al. |
| 11,463,969 B2 | 10/2022 | Li et al. |
| 11,497,050 B2 | 11/2022 | Black et al. |
| 11,563,279 B2 | 1/2023 | McCandless et al. |
| 11,670,849 B2 | 6/2023 | Mason et al. |
| 11,706,722 B2 | 7/2023 | Black et al. |
| 11,757,180 B2 | 9/2023 | McCandless et al. |
| 2001/0005406 A1 | 6/2001 | Mege et al. |
| 2002/0196185 A1 | 12/2002 | Bloy |
| 2003/0025638 A1 | 2/2003 | Apostolos |
| 2003/0062963 A1 | 4/2003 | Aikawa et al. |
| 2004/0003250 A1 | 1/2004 | Kindberg et al. |
| 2004/0038714 A1 | 2/2004 | Rhodes et al. |
| 2004/0229651 A1 | 11/2004 | Hulkkonen et al. |
| 2005/0237265 A1 | 10/2005 | Durham et al. |
| 2005/0282536 A1 | 12/2005 | McClure et al. |
| 2006/0025072 A1 | 2/2006 | Pan |
| 2007/0024514 A1 | 2/2007 | Phillips et al. |
| 2007/0147338 A1 | 6/2007 | Chandra et al. |
| 2007/0184828 A1 | 8/2007 | Majidi-Ahy |
| 2007/0202931 A1 | 8/2007 | Lee et al. |
| 2008/0039012 A1 | 2/2008 | Mckay et al. |
| 2008/0049649 A1 | 2/2008 | Kozisek et al. |
| 2008/0181328 A1 | 7/2008 | Harel et al. |
| 2009/0153407 A1 | 6/2009 | Zhang et al. |
| 2009/0176487 A1 | 7/2009 | DeMarco |
| 2009/0207091 A1 | 8/2009 | Anagnostou et al. |
| 2009/0231215 A1 | 9/2009 | Taura |
| 2009/0296938 A1 | 12/2009 | Devanand et al. |
| 2010/0197222 A1 | 8/2010 | Scheucher |
| 2010/0207823 A1 | 8/2010 | Sakata et al. |
| 2010/0248659 A1 | 9/2010 | Kawabata |
| 2010/0302112 A1 | 12/2010 | Lindenmeier et al. |
| 2011/0070824 A1 | 3/2011 | Braithwaite |
| 2011/0199279 A1 | 8/2011 | Shen et al. |
| 2011/0292843 A1 | 12/2011 | Gan et al. |
| 2012/0064841 A1 | 3/2012 | Husted et al. |
| 2012/0094630 A1 | 4/2012 | Wisnewski et al. |
| 2012/0099856 A1 | 4/2012 | Britz et al. |
| 2012/0194399 A1 | 8/2012 | Bily et al. |
| 2013/0059620 A1 | 3/2013 | Cho |
| 2013/0069834 A1 | 3/2013 | Duerksen |
| 2013/0141190 A1 | 6/2013 | Kitaoka et al. |
| 2013/0231066 A1 | 9/2013 | Zander et al. |
| 2013/0303145 A1 | 11/2013 | Harrang et al. |
| 2013/0324076 A1 | 12/2013 | Harrang |
| 2014/0094217 A1 | 4/2014 | Stafford |
| 2014/0171811 A1 | 6/2014 | Lin et al. |
| 2014/0198684 A1 | 7/2014 | Gravely et al. |
| 2014/0266946 A1 | 9/2014 | Bily et al. |
| 2014/0269417 A1 | 9/2014 | Yu et al. |
| 2014/0293904 A1 | 10/2014 | Dai et al. |
| 2014/0308962 A1 | 10/2014 | Zhang et al. |
| 2014/0349696 A1 | 11/2014 | Hyde et al. |
| 2015/0109178 A1 | 4/2015 | Hyde et al. |
| 2015/0109181 A1 | 4/2015 | Hyde et al. |
| 2015/0116153 A1 | 4/2015 | Chen et al. |
| 2015/0131618 A1 | 5/2015 | Chen |
| 2015/0162658 A1 | 6/2015 | Bowers et al. |
| 2015/0222021 A1 | 8/2015 | Stevenson et al. |
| 2015/0229028 A1 | 8/2015 | Bily et al. |
| 2015/0236777 A1 | 8/2015 | Akhtar et al. |
| 2015/0276926 A1 | 10/2015 | Bowers et al. |
| 2015/0276928 A1 | 10/2015 | Bowers et al. |
| 2015/0288063 A1 | 10/2015 | Johnson et al. |
| 2015/0318618 A1 | 11/2015 | Chen et al. |
| 2015/0372389 A1 | 12/2015 | Chen et al. |
| 2016/0037508 A1 | 2/2016 | Sun |
| 2016/0079672 A1 | 3/2016 | Cerreno |
| 2016/0087334 A1 | 3/2016 | Sayama et al. |
| 2016/0149308 A1 | 5/2016 | Chen et al. |
| 2016/0149309 A1 | 5/2016 | Chen et al. |
| 2016/0149310 A1 | 5/2016 | Chen et al. |
| 2016/0164175 A1 | 6/2016 | Chen et al. |
| 2016/0174241 A1 | 6/2016 | Ansari et al. |
| 2016/0198334 A1 | 7/2016 | Bakshi et al. |
| 2016/0219539 A1 | 7/2016 | Kim et al. |
| 2016/0241367 A1 | 8/2016 | Irmer et al. |
| 2016/0269964 A1 | 9/2016 | Murray |
| 2016/0302208 A1 | 10/2016 | Sturkovich et al. |
| 2016/0345221 A1 | 11/2016 | Axmon et al. |
| 2016/0365754 A1 | 12/2016 | Zeine et al. |
| 2016/0373181 A1* | 12/2016 | Black .................... H04W 16/28 |
| 2017/0085357 A1 | 3/2017 | Shahar |
| 2017/0118750 A1 | 4/2017 | Kikuma et al. |
| 2017/0127295 A1 | 5/2017 | Black et al. |
| 2017/0127296 A1 | 5/2017 | Gustafsson et al. |
| 2017/0127332 A1 | 5/2017 | Axmon et al. |
| 2017/0155192 A1 | 6/2017 | Black et al. |
| 2017/0155193 A1 | 6/2017 | Black et al. |
| 2017/0187123 A1 | 6/2017 | Black et al. |
| 2017/0187426 A1 | 6/2017 | Su et al. |
| 2017/0194704 A1 | 7/2017 | Chawgo et al. |
| 2017/0195054 A1 | 7/2017 | Ashrafi |
| 2017/0238141 A1 | 8/2017 | Lindoff et al. |
| 2017/0310017 A1 | 10/2017 | Howard |
| 2017/0339575 A1 | 11/2017 | Kim et al. |
| 2017/0367053 A1 | 12/2017 | Noh et al. |
| 2017/0373403 A1 | 12/2017 | Watson |
| 2018/0013193 A1 | 1/2018 | Olsen et al. |
| 2018/0019798 A1 | 1/2018 | Khan et al. |
| 2018/0027555 A1 | 1/2018 | Kim et al. |
| 2018/0066991 A1 | 3/2018 | Mueller et al. |

(56) References Cited

U.S. PATENT DOCUMENTS

| | | |
|---|---|---|
| 2018/0097286 A1 | 4/2018 | Black et al. |
| 2018/0123692 A1 | 5/2018 | Leiba |
| 2018/0177461 A1 | 6/2018 | Bell et al. |
| 2018/0219283 A1 | 8/2018 | Wilkins et al. |
| 2018/0227035 A1 | 8/2018 | Cheng et al. |
| 2018/0227445 A1 | 8/2018 | Minegishi |
| 2018/0233821 A1 | 8/2018 | Pham et al. |
| 2018/0270729 A1 | 9/2018 | Ramachandra et al. |
| 2018/0301821 A1 | 10/2018 | Black et al. |
| 2018/0337445 A1 | 11/2018 | Sullivan et al. |
| 2018/0368389 A1 | 12/2018 | Adams |
| 2019/0020107 A1 | 1/2019 | Polehn et al. |
| 2019/0052428 A1 | 2/2019 | Chu et al. |
| 2019/0053013 A1 | 2/2019 | Markhovsky et al. |
| 2019/0067813 A1 | 2/2019 | Igura |
| 2019/0219982 A1 | 7/2019 | Klassen et al. |
| 2019/0221931 A1 | 7/2019 | Black et al. |
| 2019/0289482 A1 | 9/2019 | Black |
| 2019/0289560 A1 | 9/2019 | Black et al. |
| 2019/0336107 A1 | 11/2019 | Hope Simpson et al. |
| 2019/0372671 A1 | 12/2019 | Ashrafi |
| 2020/0008163 A1 | 1/2020 | Black et al. |
| 2020/0036413 A1 | 1/2020 | Deutsch et al. |
| 2020/0083605 A1 | 3/2020 | Quarfoth et al. |
| 2020/0083960 A1 | 3/2020 | Ashrafi |
| 2020/0091607 A1 | 3/2020 | Black et al. |
| 2020/0137698 A1 | 4/2020 | Black et al. |
| 2020/0186227 A1 | 6/2020 | Reider et al. |
| 2020/0205012 A1 | 6/2020 | Bengtsson et al. |
| 2020/0251802 A1 | 8/2020 | Katko et al. |
| 2020/0259552 A1 | 8/2020 | Ashworth |
| 2020/0266533 A1 | 8/2020 | McCandless et al. |
| 2020/0313741 A1 | 10/2020 | Zhu et al. |
| 2020/0366363 A1 | 11/2020 | Li et al. |
| 2020/0403689 A1* | 12/2020 | Rofougaran ........ H04W 52/245 |
| 2021/0036437 A1 | 2/2021 | Zhang et al. |
| 2021/0067237 A1 | 3/2021 | Sampath et al. |
| 2021/0159945 A1 | 5/2021 | Deutsch et al. |
| 2021/0167819 A1 | 6/2021 | Deutsch et al. |
| 2021/0176719 A1 | 6/2021 | Black et al. |
| 2021/0185623 A1 | 6/2021 | Black et al. |
| 2021/0234591 A1 | 7/2021 | Eleftheriadis et al. |
| 2021/0313677 A1 | 10/2021 | McCandless et al. |
| 2021/0328366 A1 | 10/2021 | McCandless et al. |
| 2021/0328664 A1 | 10/2021 | Schwab et al. |
| 2021/0367684 A1 | 11/2021 | Bendinelli et al. |
| 2021/0368355 A1 | 11/2021 | Liu et al. |
| 2021/0376912 A1 | 12/2021 | Black et al. |
| 2022/0014933 A1 | 1/2022 | Moon et al. |
| 2022/0038858 A1 | 2/2022 | Rea |
| 2022/0053433 A1 | 2/2022 | Abedini et al. |
| 2022/0078762 A1 | 3/2022 | Machado et al. |
| 2022/0085498 A1 | 3/2022 | Mason et al. |
| 2022/0085869 A1 | 3/2022 | Black et al. |
| 2022/0102828 A1 | 3/2022 | Katko et al. |
| 2022/0232396 A1 | 7/2022 | Cavcic et al. |
| 2022/0240305 A1 | 7/2022 | Black et al. |
| 2022/0302992 A1 | 9/2022 | Sivaprakasam et al. |
| 2022/0369295 A1 | 11/2022 | Machado et al. |
| 2023/0126395 A1 | 4/2023 | McCandless et al. |
| 2023/0155666 A1 | 5/2023 | Black et al. |
| 2023/0164796 A1 | 5/2023 | Black et al. |

FOREIGN PATENT DOCUMENTS

| | | |
|---|---|---|
| CA | 3092509 A1 | 9/2019 |
| CN | 102948089 A | 2/2013 |
| CN | 103700951 A | 4/2014 |
| CN | 106572622 A | 4/2017 |
| CN | 106664124 A | 5/2017 |
| CN | 106797074 A | 5/2017 |
| CN | 109478900 A | 3/2019 |
| CN | 110034416 A | 7/2019 |
| CN | 110521277 A | 11/2019 |
| CN | 111903063 A | 11/2020 |
| EP | 3440778 A1 | 10/2017 |
| EP | 3273629 A1 | 1/2018 |
| EP | 3603329 A1 | 9/2018 |
| EP | 3769429 A1 | 9/2019 |
| EP | 3831115 A1 | 2/2020 |
| EP | 3928380 A1 | 8/2020 |
| EP | 4085494 A1 | 7/2021 |
| EP | 4136759 A1 | 10/2021 |
| EP | 4158796 A1 | 12/2021 |
| JP | S61-1102 A | 1/1986 |
| JP | H09-36656 A | 2/1997 |
| JP | H09-214418 A | 8/1997 |
| JP | 2000-111630 A | 4/2000 |
| JP | 3307146 B2 | 7/2002 |
| JP | 2004-270143 A | 9/2004 |
| JP | 3600459 B2 | 12/2004 |
| JP | 2007-81648 A | 3/2007 |
| JP | 2007-306273 A | 11/2007 |
| JP | 2008-153798 A | 7/2008 |
| JP | 2009-514329 A | 4/2009 |
| JP | 2010-226457 A | 10/2010 |
| JP | 2011-507367 A | 3/2011 |
| JP | 2011-508994 A | 3/2011 |
| JP | 2012-175189 A | 9/2012 |
| JP | 2013-539949 A | 10/2013 |
| JP | 2014-075788 A | 4/2014 |
| JP | 2014-207626 A | 10/2014 |
| JP | 2014-531826 A | 11/2014 |
| JP | 2016-139965 A | 8/2016 |
| JP | 2017-220825 A | 12/2017 |
| JP | 2018-14713 A | 1/2018 |
| JP | 2018-173921 A | 11/2018 |
| JP | 2019-518355 A | 6/2019 |
| JP | 2020-515162 A | 5/2020 |
| JP | 2020-523863 A | 8/2020 |
| JP | 2020-145614 A | 9/2020 |
| JP | 2021-517406 A | 7/2021 |
| JP | 2021-532683 A | 11/2021 |
| JP | 2022-521286 A | 4/2022 |
| JP | 2023-519067 A | 5/2023 |
| JP | 2023-522640 A | 5/2023 |
| JP | 2023-527384 A | 6/2023 |
| KR | 10-2006-0031895 A | 4/2006 |
| KR | 10-2008-0093257 A | 10/2008 |
| KR | 10-2016-0072062 A | 6/2016 |
| KR | 10 2016 0113100 A | 9/2016 |
| KR | 10-2016-0113100 A | 9/2016 |
| KR | 10-2019-0010545 A | 1/2019 |
| KR | 10-2019-0133194 A | 12/2019 |
| KR | 10-2020-0123254 A | 10/2020 |
| KR | 10-2021-0048499 A | 5/2021 |
| KR | 10-2021-0125579 A | 10/2021 |
| KR | 10-2022-0129570 A | 9/2022 |
| KR | 10-2023-0009895 A | 1/2023 |
| KR | 10-2023-0017280 A | 2/2023 |
| TW | 202037208 A | 10/2020 |
| WO | 2007001134 A1 | 1/2007 |
| WO | 2010104435 A1 | 9/2010 |
| WO | 2012050614 A1 | 4/2012 |
| WO | 2012096611 A2 | 7/2012 |
| WO | 2012161612 A1 | 11/2012 |
| WO | 2013023171 A1 | 2/2013 |
| WO | 2015196044 A1 | 12/2015 |
| WO | 2016044069 A1 | 3/2016 |
| WO | 2017008851 A1 | 1/2017 |
| WO | 2017014842 A1 | 1/2017 |
| WO | 2017/176746 A1 | 10/2017 |
| WO | 2017193056 A1 | 11/2017 |
| WO | 2018144940 A1 | 8/2018 |
| WO | 2018/175615 A1 | 9/2018 |
| WO | 2018179870 A1 | 10/2018 |
| WO | 2019/139745 A1 | 7/2019 |
| WO | 2019/183072 A1 | 9/2019 |
| WO | 2019/183107 A1 | 9/2019 |
| WO | 2020/027990 A1 | 2/2020 |
| WO | 2020/060705 A1 | 3/2020 |
| WO | 2020/076350 A1 | 4/2020 |
| WO | 2020095597 A1 | 5/2020 |
| WO | 2020/163052 A1 | 8/2020 |

(56) References Cited

FOREIGN PATENT DOCUMENTS

| WO | 2020/171947 | A1 | 8/2020 |
| WO | 2021003112 | A1 | 1/2021 |
| WO | 2021/137898 | A1 | 7/2021 |
| WO | 2021/211354 | A1 | 10/2021 |
| WO | 2021/242996 | A1 | 12/2021 |
| WO | 2022/031477 | A1 | 2/2022 |
| WO | 2022/056024 | A1 | 3/2022 |
| WO | 2022/155529 | A1 | 7/2022 |
| WO | 2022/164930 | A1 | 8/2022 |
| WO | 2023/283352 | A1 | 1/2023 |
| WO | 2023/076405 | A1 | 5/2023 |

OTHER PUBLICATIONS

U.S. Appl. No. 14/510,947, filed Oct. 9, 2014, pp. 1-76.
Office Communication for U.S. Appl. No. 16/049,630 dated Oct. 4, 2018, pp. 1-13.
Office Communication for U.S. Appl. No. 15/870,758 dated Oct. 1, 2018, pp. 1-12.
Office Communication for U.S. Appl. No. 16/136,119 dated Nov. 23, 2018, pp. 1-12.
Office Communication for U.S. Appl. No. 16/136,119 dated Mar. 15, 2019, pp. 1-8.
Office Communication for U.S. Appl. No. 16/292,022 dated Jun. 7, 2019, pp. 1-13.
Office Communication for U.S. Appl. No. 16/049,630 dated Apr. 12, 2019, pp. 1-13.
Office Communication for U.S. Appl. No. 16/268,469 dated May 16, 2019, pp. 1-16.
Office Communication for U.S. Appl. No. 16/280,939 dated May 13, 2019, pp. 1-22.
Office Communication for U.S. Appl. No. 16/440,815 dated Jul. 17, 2019, pp. 1-16.
Office Communication for U.S. Appl. No. 16/358,112 dated May 15, 2019, pp. 1-17.
International Search Report and Written Opinion for International Patent Application No. PCT/US2019/022942 dated Jul. 4, 2019, pp. 1-12.
Yurduseven, Okan et al., "Dual-Polarization Printed Holographic Multibeam Metasurface Antenna" Aug. 7, 2017, IEEE Antennas and Wireless Propagation Letters. PP. 10.1109/LAWP.2017, pp. 1-4.
International Search Report and Written Opinion for International Patent Application No. PCT/US2019/022987 dated Jul. 2, 2019, pp. 1-13.
Office Communication for U.S. Appl. No. 16/049,630 dated Jun. 24, 2019, pp. 1-5.
Office Communication for U.S. Appl. No. 16/280,939 dated Jul. 18, 2019, pp. 1-7.
Office Communication for U.S. Appl. No. 16/049,630 dated Aug. 7, 2019, pp. 1-13.
Office Communication for U.S. Appl. No. 16/292,022 dated Sep. 23, 2019, pp. 1-9.
Office Communication for U.S. Appl. No. 16/440,815 dated Oct. 7, 2019, pp. 1-5.
Office Communication for U.S. Appl. No. 16/268,469 dated Sep. 10, 2019, pp. 1-11.
International Search Report and Written Opinion for International Patent Application No. PCT/US2019/041053 dated Aug. 27, 2019, pp. 1-8.
Office Communication for U.S. Appl. No. 16/568,096 dated Oct. 24, 2019, pp. 1-10.
International Search Report and Written Opinion for International Patent Application No. PCT/US2019/047093 dated Oct. 21, 2019, pp. 1-7.
Office Communication for U.S. Appl. No. 16/049,630 dated Dec. 9, 2019, pp. 1-13.
Office Communication for U.S. Appl. No. 16/440,815 dated Jan. 8, 2020, pp. 1-8.
Office Communication for U.S. Appl. No. 16/730,932 dated Mar. 6, 2020, pp. 1-13.
Office Communication for U.S. Appl. No. 16/049,630 dated Mar. 31, 2020, pp. 1-15.
Office Communication for U.S. Appl. No. 16/734,195 dated Mar. 20, 2020, pp. 1-8.
Office Communication for U.S. Appl. No. 16/846,670 dated Jun. 11, 2020, pp. 1-12.
Office Communication for U.S. Appl. No. 16/673,852 dated Jun. 24, 2020, pp. 1-11.
International Search Report and Written Opinion for International Patent Application No. PCT/US2020/016641 dated Apr. 14, 2020, pp. 1-7.
Gao, S.S. et al., "Holographic Artificial Impedance Surface Antenna Based on Circular Patch", 2018 International Conference on Microwave and Millimeter Wave Technology (ICMMT), 2018, pp. 1-3.
Nishiyama, Eisuke et al., "Polarization Controllable Microstrip Antenna using Beam Lead PIN Diodes", 2006 Asia-Pacific Microwave Conference, 2006, pp. 1-4.
International Search Report and Written Opinion for International Patent Application No. PCT/US2020/013713 dated Apr. 21, 2020, pp. 1-8.
Office Communication for U.S. Appl. No. 16/049,630 dated Aug. 19, 2020, pp. 1-18.
Office Communication for U.S. Appl. No. 16/730,932 dated Aug. 25, 2020, pp. 1-5.
Office Communication for U.S. Appl. No. 16/983,927 dated Aug. 31, 2020, pp. 1-7.
Office Communication for U.S. Appl. No. 16/983,978 dated Sep. 16, 2020, pp. 1-7.
Office Communication for U.S. Appl. No. 16/049,630 dated Oct. 15, 2020, pp. 1-16.
Office Communication for U.S. Appl. No. 16/983,978 dated Oct. 27, 2020, pp. 1-13.
International Search Report and Written Opinion for International Patent Application No. PCT/US2020/048806 dated Nov. 17, 2020, pp. 1-9.
Office Communication for U.S. Appl. No. 16/673,852 dated Nov. 25, 2020, pp. 1-8.
Office Communication for U.S. Appl. No. 16/846,670 dated Nov. 25, 2020, pp. 1-13.
Office Communication for U.S. Appl. No. 16/983,927 dated Jan. 6, 2021, pp. 1-8.
Office Communication for U.S. Appl. No. 16/846,670 dated Feb. 8, 2021, pp. 1-4.
Office Communication for U.S. Appl. No. 16/983,978 dated Feb. 10, 2021, pp. 1-11.
Office Communication for U.S. Appl. No. 16/846,670 dated Apr. 2, 2021, pp. 1-9.
Office Communication for U.S. Appl. No. 16/730,690 dated Apr. 8, 2021, pp. 1-11.
Office Communication for U.S. Appl. No. 17/177,131 dated Apr. 9, 2021, pp. 1-17.
Vu, Trung Kien et al., "Joint Load Balancing and Interference Mitigation in 5G Heterogeneous Networks," IEEE Transactions on Wireless Communications, 2017, vol. 16, No. 9, pp. 6032-6046.
Office Communication for U.S. Appl. No. 17/177,145 dated Apr. 19, 2021, pp. 1-11.
Office Communication for U.S. Appl. No. 17/112,940 dated Jul. 21, 2021, pp. 1-22.
International Search Report and Written Opinion for International Patent Application No. PCT/US2021/026400 dated Jul. 20, 2021, pp. 1-7.
Office Communication for U.S. Appl. No. 17/177,145 dated Aug. 3, 2021, pp. 1-16.
Office Communication for U.S. Appl. No. 17/177,131 dated Aug. 6, 2021, pp. 1-16.
Office Communication for U.S. Appl. No. 17/112,940 dated Aug. 9, 2021, pp. 1-20.
International Search Report and Written Opinion for International Patent Application No. PCT/US2021/034479 dated Aug. 10, 2021, pp. 1-7.

(56) References Cited

OTHER PUBLICATIONS

Office Communication for U.S. Appl. No. 17/332,136 dated Sep. 2, 2021, pp. 1-9.
Office Communication for Chinese Patent Application No. 201980019925.1 dated Sep. 27, 2021, pp. 1-25.
Office Communication for U.S. Appl. No. 17/177,145 dated Oct. 14, 2021, pp. 1-5.
International Search Report and Written Opinion for International Patent Application No. PCT/US2021/043308 dated Nov. 2, 2021, pp. 1-8.
Office Communication for U.S. Appl. No. 17/177,131 dated Nov. 12, 2021, pp. 1-5.
Extended European Search Report for European Patent Application No. 19772471.9 dated Nov. 8, 2021, pp. 1-8.
Office Communication for U.S. Appl. No. 17/177,145 dated Nov. 16, 2021, pp. 1-16.
Office Communication for U.S. Appl. No. 17/177,131 dated Dec. 17, 2021, pp. 1-14.
Black, Eric J., "Holographic Beam Forming and MIMO," Pivotal Commware, 2017, pp. 1-8.
Björn, Ekman, "Machine Learning for Beam Based Mobility Optimization in NR," Master of Science Thesis in Communication Systems, Department of Electrical Engineering, Linköping University, 2017, pp. 1-85.
Office Communication for U.S. Appl. No. 17/112,940 dated Dec. 22, 2021, pp. 1-15.
International Search Report and Written Opinion for International Patent Application No. PCT/US2021/049502 dated Dec. 14, 2021, pp. 1-8.
Office Communication for U.S. Appl. No. 17/469,694 dated Jan. 20, 2022, pp. 1-9.
Office Communication for U.S. Appl. No. 17/537,233 dated Feb. 4, 2022, pp. 1-9.
Office Communication for U.S. Appl. No. 17/112,940 dated Mar. 17, 2022, pp. 1-16.
Office Communication for U.S. Appl. No. 17/576,832 dated Mar. 18, 2022, pp. 1-15.
Office Communication for U.S. Appl. No. 17/177,145 dated Mar. 24, 2022, pp. 1-18.
Office Communication for U.S. Appl. No. 17/306,361 dated Mar. 28, 2022, pp. 1-7.
Extended European Search Report for European Patent Application No. 19844867.2 dated Mar. 30, 2022, pp. 1-16.
Office Communication for U.S. Appl. No. 17/576,832 dated Apr. 1, 2022, pp. 1-14.
Office Communication for U.S. Appl. No. 17/585,418 dated Apr. 8, 2022, pp. 1-9.
Office Communication for U.S. Appl. No. 17/537,233 dated Apr. 20, 2022, pp. 1-9.
Office Communication for U.S. Appl. No. 17/203,255 dated Apr. 26, 2022, pp. 1-17.
Office Communication for U.S. Appl. No. 17/177,131 dated Apr. 27, 2022, pp. 1-14.
International Search Report and Written Opinion for International Patent Application No. PCT/US2022/012613 dated May 10, 2022, pp. 1-8.
International Search Report and Written Opinion for International Patent Application No. PCT/US2022/013942 dated May 10, 2022, pp. 1-8.
Qualcomm Incorporated, "Common understanding of repeaters," 3GPP TSG RAN WG4 #98_e R4-2102829, 2021, https://www.3gpp.org/ftp/tsg_ran/WG4_Radio/TSGR4_98_e/Docs/R4-2102829.zip, Accessed: May 25, 2022, pp. 1-2.
MediaTek Inc., "General views on NR repeater," 3GPP TSG RAN WG4 #98_e R4-2101156, 2021, https://www.3gpp.org/ftp/tsg_ran/WG4_Radio/TSGR4_98_e/Docs/R4-2101156.zip, Accessed: May 25, 2022, pp. 1-4.
Office Communication for U.S. Appl. No. 17/177,145 dated Jun. 3, 2022, pp. 1-5.
Office Communication for U.S. Appl. No. 17/576,832 dated Jul. 13, 2022, pp. 1-15.
Office Communication for U.S. Appl. No. 17/585,418 dated Jul. 22, 2022, pp. 1-6.
Office Communication for U.S. Appl. No. 17/585,418 dated Aug. 4, 2022, pp. 1-2.
Office Communication for U.S. Appl. No. 17/306,361 dated Sep. 9, 2022, pp. 1-7.
Office Communication for U.S. Appl. No. 17/576,832 dated Sep. 23, 2022, pp. 1-5.
Office Communication for U.S. Appl. No. 17/306,361 dated Sep. 27, 2022, pp. 1-7.
Office Communication for U.S. Appl. No. 17/379,813 dated Oct. 5, 2022, pp. 1-11.
Office Communication for U.S. Appl. No. 17/217,882 dated Oct. 13, 2022, pp. 1-14.
Office Communication for U.S. Appl. No. 17/397,442 dated Oct. 27, 2022, pp. 1-8.
International Search Report and Written Opinion for International Patent Application No. PCT/US2022/036381 dated Oct. 25, 2022, pp. 1-8.
Extended European Search Report for European Patent Application No. 20759272.6 dated Nov. 3, 2022, pp. 1-9.
Office Communication for U.S. Appl. No. 17/334,105 dated Nov. 30, 2022, pp. 1-7.
Office Communication for U.S. Appl. No. 17/576,832 dated Dec. 15, 2022, pp. 1-15.
Falconer, David D. et al., "Coverage Enhancement Methods for LMDS," IEEE Communications Magazine, Jul. 2003, vol. 41, Iss. 7, pp. 86-92.
Office Communication for U.S. Appl. No. 17/708,757 dated Jan. 20, 2023, pp. 1-5.
Office Communication for U.S. Appl. No. 17/891,970 dated Jun. 16, 2023, pp. 1-11.
Office Communication for U.S. Appl. No. 17/397,442 dated Jun. 23, 2023, pp. 1-15.
Office Communication for U.S. Appl. No. 17/379,813 dated Feb. 3, 2023, pp. 1-10.
Office Communication for U.S. Appl. No. 17/112,895 dated Feb. 6, 2023, pp. 1-8.
Office Communication for U.S. Appl. No. 17/379,813 dated Feb. 15, 2023, pp. 1-3.
International Search Report and Written Opinion for International Patent Application No. PCT/US2022/047909 dated Feb. 21, 2023, pp. 1-7.
Office Communication for Japanese Patent Application No. JP 2020-548724 dated Mar. 8, 2023, pp. 1-9.
Shimura, Tatsuhiro et al., "A study of indoor area expansion by quasi-millimeter wave repeater," The Collection of Lecture Articles of the 2018 IEICE General Conference, Mar. 2018, pp. 1-5.
Office Communication for U.S. Appl. No. 17/576,832 dated Apr. 28, 2023, pp. 1-15.
Office Communication for U.S. Appl. No. 17/217,882 dated May 15, 2023, pp. 1-6.
Office Communication for Japanese Patent Application No. JP 2021-505304 dated May 9, 2023, pp. 1-6.
Office Communication for U.S. Appl. No. 17/980,391 dated Jul. 3, 2023, pp. 1-9.
Office Communication for Japanese Patent Application No. JP 2020-548724 dated Jun. 15, 2023, pp. 1-5.
International Search Report and Written Opinion for International Patent Application No. PCT/US2023/018993 dated Jun. 27, 2023, pp. 1-9.
Office Communication for U.S. Appl. No. 17/576,832 dated Jul. 13, 2023, pp. 1-4.
Office Communication for U.S. Appl. No. 18/136,238 dated Jul. 20, 2023, pp. 1-8.
Examination Report for European Patent Application No. 19772471.9 dated Jul. 28, 2023, pp. 1-4.
Cheng et al., "Real-time two-dimensional beam steering with gate-tunable materials: a theoretical investigation", Applied Optics, vol. 55, No. 22, Aug. 1, 2016, pp. 6137-6144.

(56) References Cited

OTHER PUBLICATIONS

Wolf et al., "Phased-Array Sources Based on Nonlinear Metamaterial Nanocavities", Nature Communications, vol. 6, 7667, 2015 Macmillan Publishers Limited, pp. 1-6.
Examination Report No. 1 for Australian Patent Application No. 2019239864, dated Jul. 7, 2022, pp. 1-3.
Intention to Grant for European Patent Application No. 20759272.6 dated Sep. 19, 2023, 11 pages.
International Preliminary Report on Patentability Chapter 1 for International Patent Application No. PCT/US2018/066329 dated Jul. 23, 2020, pp. 1-7.
International Preliminary Report on Patentability Chapter I for International Patent Application No. PCT/US2019/022987 dated Oct. 1, 2020, pp. 1-9.
International Preliminary Report on Patentability Chapter I for International Patent Application No. PCT/US2019/041053 dated Feb. 11, 2021, pp. 1-6.
International Preliminary Report on Patentability Chapter I for International Patent Application No. PCT/US2019/047093 dated Apr. 1, 2021, pp. 1-5.
International Preliminary Report on Patentability Chapter I for International Patent Application No. PCT/US2020/013713 dated Aug. 19, 2021, pp. 1-6.
International Preliminary Report on Patentability Chapter I for International Patent Application No. PCT/US2020/016641 dated Sep. 2, 2021, pp. 1-5.
International Preliminary Report on Patentability Chapter I for International Patent Application No. PCT/US2020/048806 dated Jul. 14, 2022, pp. 1-7.
International Preliminary Report on Patentability Chapter I for International Patent Application No. PCT/US2021/034479 dated Dec. 8, 2022, pp. 1-5.
International Preliminary Report on Patentability Chapter I for International Patent Application No. PCT/US2021/043308 dated Feb. 16, 2023, pp. 1-6.
International Preliminary Report on Patentability Chapter I for International Patent Application No. PCT/US2021/049502 dated Mar. 23, 2023, pp. 1-6.
International Preliminary Report on Patentability Chapter I for International Patent Application No. PCT/US2022/012613 dated Jul. 27, 2023, pp. 1-6.
International Preliminary Report on Patentability Chapter I for International Patent Application No. PCT/US2022/013942 dated Aug. 10, 2023, pp. 1-6.
International Preliminary Report on Patentability Chapter I for International Patent Application No. PCT/US2021/026400 dated Oct. 27, 2022, pp. 1-5.
International Preliminary Report on Patentability for International Patent Application No. PCT/US2019/022942 dated Oct. 1, 2020, pp. 1-8.
International Search Report and Written Opinion for International Patent Application No. PCT/US2018/066329 dated May 31, 2019, pp. 1-8.
Notice of Acceptance for Australian Patent Application No. 2019239864 dated Jan. 16, 2023, pp. 1-3.
Office Action for Korean Patent Application No. KR 10-2020-7029161 dated Jul. 19, 2023, pp. 1-16 including English translation.
Office Communication for U.S. Appl. No. 15/870,758 dated Apr. 16, 2019, pp. 1-10.
Office Communication for U.S. Appl. No. 15/925,612 dated Dec. 19, 2018, pp. 1-12.
Office Communication for U.S. Appl. No. 16/049,630 dated Feb. 18, 2020, pp. 1-5.
Office Communication for U.S. Appl. No. 16/730,690 dated Apr. 21, 2021, pp. 1-2.
Office Communication for U.S. Appl. No. 16/846,670 dated Apr. 21, 2021, pp. 1-2.
Office Communication for U.S. Appl. No. 17/203,255 dated May 5, 2022, pp. 1-2.
Office Communication for U.S. Appl. No. 17/334,105 dated Aug. 11, 2023, pp. 1-16.
Office Communication for U.S. Appl. No. 17/397,442 dated Sep. 8, 2023, pp. 1-16.
Office Communication for U.S. Appl. No. 17/576,832 dated Aug. 16, 2023, pp. 1-7.
Office Communication for U.S. Appl. No. 17/576,832 dated Aug. 24, 2023, pp. 1-4.
Office Communication for U.S. Appl. No. 17/708,757 dated Aug. 4, 2023, pp. 1-8.
Office Communication for U.S. Appl. No. 17/891,970 dated Sep. 25, 2023, pp. 1-8.
Search Report for Chinese Patent Application No. 201980019925.1 dated Sep. 19, 2021, pp. 1-2.
U.S. Appl. No. 62/743,672, filed Oct. 10, 2018, pp. 1-278.
Office Communication for U.S. Appl. No. 17/334,105 dated Oct. 25, 2023, pp. 1-2.
Office Communication for U.S. Appl. No. 18/136,238 dated Oct. 25, 2023, pp. 1-9.

* cited by examiner

MULTIPATH REPEATER SYSTEMS

CROSS-REFERENCE TO RELATED APPLICATION

This application is a Utility patent application based on previously filed U.S. Provisional Patent Application No. 63/219,318 filed on Jul. 7, 2021. The benefit of the filing date of this provisional application is hereby claimed under 35 U.S.C. § 119(e) and the contents of this provisional application are herein incorporated by reference in their entirety.

TECHNICAL FIELD

This invention relates generally to employing RF signal repeaters to improve MIMO communications within a wireless communications network such as a 5G communications network operating at FR1 or FR2 frequency bands.

BACKGROUND

Wireless communications networks may employ MIMO technologies to enhance bandwidth between a wireless communications base station and one or more user equipment devices within a service area of the base station. The wireless communications networks can include, for example, 5G communications networks, which typically operate in two frequency bands indicated as "FR1" and "FR2." FR1 roughly corresponds to frequencies below 7.125 GHz, and FR2 corresponds to "millimeter wave" frequencies above 24.25 GHz.

In a MIMO scenario, a MIMO base station can include multiple transmitter radio chains capable of transmitting multiple data streams over multiple spatial layers, and each MIMO user equipment device can include multiple receiver radio chains capable of receiving those multiple data streams simultaneously over the multiple spatial layers. Generally speaking, if a MIMO base station provides M transmit radio chains, and a single MIMO user equipment device provides N receive radio chains, the system nominally supports communication between the MIMO base station and the single user equipment over a number of layers equal to min(M,N). To enhance bandwidth for this communication between the MIMO base station and the single user equipment, the base station attempts to allocate each layer to a separate "channel" which corresponds to a physical transmission path from the base station to the user equipment through the intervening environment. For example, one transmission path might be a direct line-of-sight propagation of an RF signal from the base station to the user equipment, while second, third, etc. transmission paths might correspond to multipath or non-line-of-sight propagation of RF signals from the base station to the user equipment, e.g. due to one or more reflections from structures within the intervening environment.

In practice, the number of actual or usable spatial layers can be less than the nominal number of spatial layers min(M,N). This can occur if the intervening environment does not provide an orthogonal set of suitable physical channels that can be allocated to the MIMO spatial layers. Thus, for example, in a preferred but impractical scenario where a base station and a user equipment device are enclosed within a shield room with metallic non-absorbing walls, the shield room provides a multipath-rich environment by virtue of reflections from the walls, and channels may be available for all or most nominal spatial layers. On the other hand, tests within anechoic chambers or within real-world environments often show not more than two usable spatial layers corresponding to two orthogonal RF polarizations for line-of-sight transmission between base station and user equipment. This is due to the typical absence of suitable ambient reflective structures within the intervening environment.

DESCRIPTION OF VARIOUS EMBODIMENTS OF THE INVENTION

Figure 1:
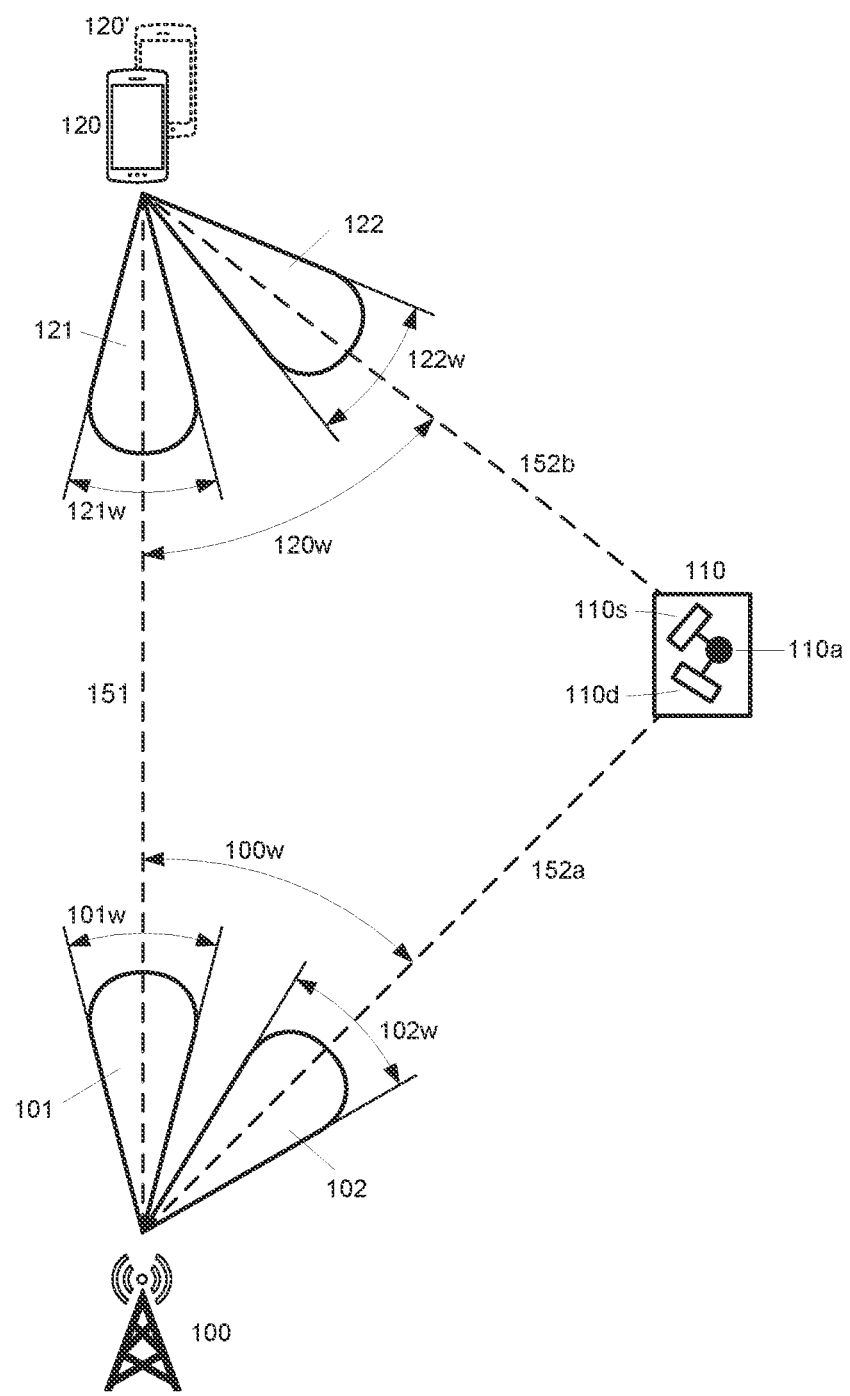
FIG. 1 depicts a MIMO communications system that includes a MIMO base station, a repeater, and a MIMO user equipment device.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Similarly, the phrase "in another embodiment" as used herein does not necessarily refer to a different embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments of the invention provide for enhanced MIMO communication between a MIMO base station and a MIMO user equipment device by providing additional paths for communication between base station and user equipment through one or more RF signal repeaters. As discussed above, real-world environments often show not more than two usable spatial layers corresponding to two orthogonal RF polarizations for line-of-sight transmission between base station and user equipment, and this is due to the common shortage of suitable ambient reflective structures within the ambient environment between and surrounding the base station and user equipment. Embodiments of the invention employ RF signal repeaters to provide one or more additional physical channels for communication between the MIMO base station and the MIMO user equipment. These RF signal repeaters can be regarded as increasing the channel diversity within the ambient environment. Rather than depending on chance to provide the needed channel diversity, the channel can now be engineered to force the existence of additional spatial layers. In some approaches, this technique can be utilized for "hotspot" quenching, i.e., to provide additional channel diversity for communication between the MIMO base station and a high density of user equipment devices for a particular region within the service area of the MIMO base station.

Illustrative MIMO Communication System

With reference now to FIG. 1, an illustrative MIMO scenario is depicted. In this scenario, a MIMO base station 100 communicates with MIMO user equipment 120, and multipath MIMO communication is facilitated by the RF repeater 110.

The MIMO base station 100 can be, for example, a 5G MIMO gNB base station for FR1 or FR2 communications with recipients within a coverage area of the base station. In other embodiments, the MIMO base station 100 can be a 4G MIMO eNB base station. These are non-limiting examples and embodiments are contemplated for any wireless communications protocols that are compatible with MIMO communications principles.

In the illustrative example, the MIMO base station 100 communicates with the MIMO user equipment 120 using at least two MIMO spatial channels: a first MIMO spatial channel corresponding to a first path 151 between the base station 100 and the user equipment 120, and a second MIMO spatial channel corresponding to a second path 152 having two segments 152a and 152b. Segment 152a of the second path is a path between the MIMO base station 100 and the RF repeater 110, while segment 152b of the second path is a path between the RF repeater 110 and user equipment 120. Thus, in the illustrative example, the first path 151 is a line-of-sight path between base station 100 and user equipment 120, while the second path 152a, 152b is a non-line-of-sight path between base station 100 and user equipment 120 via the RF repeater 110.

The MIMO base station can distinguish separate spatial channels for the separate paths 151, 152 by having one or more beamforming antennas with sufficient angular resolution. For example, the MIMO base station can provide a first beam 101 having beamwidth 101w along path 151 (i.e., in the direction of the user equipment 110), and a second beam 102 having beamwidth 102w along path 152a (i.e., in the direction of the RF repeater 110). The spatial channels are distinguishable if the subtended angle 100w between the user equipment 120 and the RF repeater 110, as viewed from the base station 100, exceeds the beamwidths 101w, 102w of the beams 101, 102 facing the user equipment 120 and RF repeater 110, respectively.

In some approaches, the one or more beamforming antennas of the MIMO base station 100 can include one or more array antennas. A typical array antenna might be an array of elements forming a physical aperture having an area $M\lambda \times N\lambda$, where $\lambda$ is a wavelength corresponding to an operating frequency of the communications system and M and N are numbers greater than or equal to 1. M and N can be integers, half-integers, or other fractional numbers. The beamforming capability then depends on the overall dimensions of the array antenna. For example, a $4\lambda \times 4\lambda$ aperture would provide an angular resolution of about 12°.

Regarding the MIMO communication from the user equipment side, the MIMO user equipment 120 can similarly distinguish separate the spatial channels for the separate paths 151, 152 by having one or more beamforming antennas with sufficient angular resolution. For example, the MIMO user equipment can provide a first beam 121 having beamwidth 121w along path 151 (i.e., in the direction of the base station 100), and a second beam 122 having beamwidth 122w along path 152b (i.e., in the direction of the RF repeater 110). The spatial channels are distinguishable if the subtended angle 120w between the base station 100 and the RF repeater 110, as viewed from the user equipment 120, exceeds the beamwidths 121w, 122w of the beams 121, 122 cast towards the base station 100 and RF repeater 110, respectively.

In some approaches, the one or more beamforming antennas of the MIMO user equipment 120 can include one or more array antennas. A typical array antenna might be an array of elements forming a physical aperture having an area $M\lambda \times N\lambda$, where $\lambda$ is a wavelength corresponding to an operating frequency of the communications system and M and N are numbers greater than or equal to 1. M and N can be integers, half-integers, or other fractional numbers. For example, a $4\lambda \times 4\lambda$ aperture would provide an angular resolution of about 12°. In some scenarios, the MIMO user equipment might be fixed wireless equipment with a relatively larger aperture providing higher angular resolution for distinguishing spatial channels, while in other scenarios, the MIMO user equipment might be a smaller device such as a mobile phone; in the latter case, the angular separation 120w may need to be 90° or larger.

In the illustrative scenario of FIG. 1, the RF repeater 110 is a device that is installed on a structure 110a, which might be a post, pole, building corner, or any other structure suitable for installation of an RF repeater. The RF repeater is configured to receive signals from base station 100 and rebroadcast the received signals to the user equipment 120. The repeater can include a donor antenna (e.g., 110d) providing a beam that points at the base station 100, and a service antenna (e.g., 110s) providing a beam that covers a rebroadcast service area, e.g., including the user equipment 120 The donor antenna and/or the service antenna can be electronically adjustable antennas such as holographic beamforming antennas. Various RF repeater structures are described, for example, in U.S. Pat. No. 10,425,905, which is herein incorporated by reference.

While the illustrative example of FIG. 1 depicts two spatial channels 151 and 152, where the first channel 151 is a line-of-sight channel and the second channel 152 is a non-line of sight channel directed through repeater 110, in other embodiments, both channels can be non-line-of-sight. For example, the first channel can be a reflected by an ambient reflective structure within the environment, or the first channel can be directed through a second repeater, not shown. In yet other embodiments, the MIMO communication between the base station 100 and the user equipment 120 can occur over three channels, where the first is a line-of-sight channel corresponding to path 151, the second is a non-line-of-sight channel corresponding to path 152a, 152b by way of repeater 110, and the third is a non-line-of-sight channel (not shown) corresponding to a third path by way of another repeater.

In some approaches, more than one user equipment device may be substantially co-located within a region and embodiments employ MIMO techniques to provide "hotspot quenching" to increase bandwidth for these substantially co-located user equipment devices. In the illustrative scenario of FIG. 1, two user equipment devices 120, 120' may be co-located at an intersection of the first path 151 and the second path 152b. Thus, either or both of the user equipment devices 120, 120' may have access to either or both of the first and second spatial layers supported by the first path 151 and second path 152b. For example, user equipment device 120 may utilize the first spatial layer for communication with the MIMO base station 100, while user equipment device 120' may utilize the second spatial layer for communication with the MIMO base station 100.

Illustrative Process Flows

Figure 2:
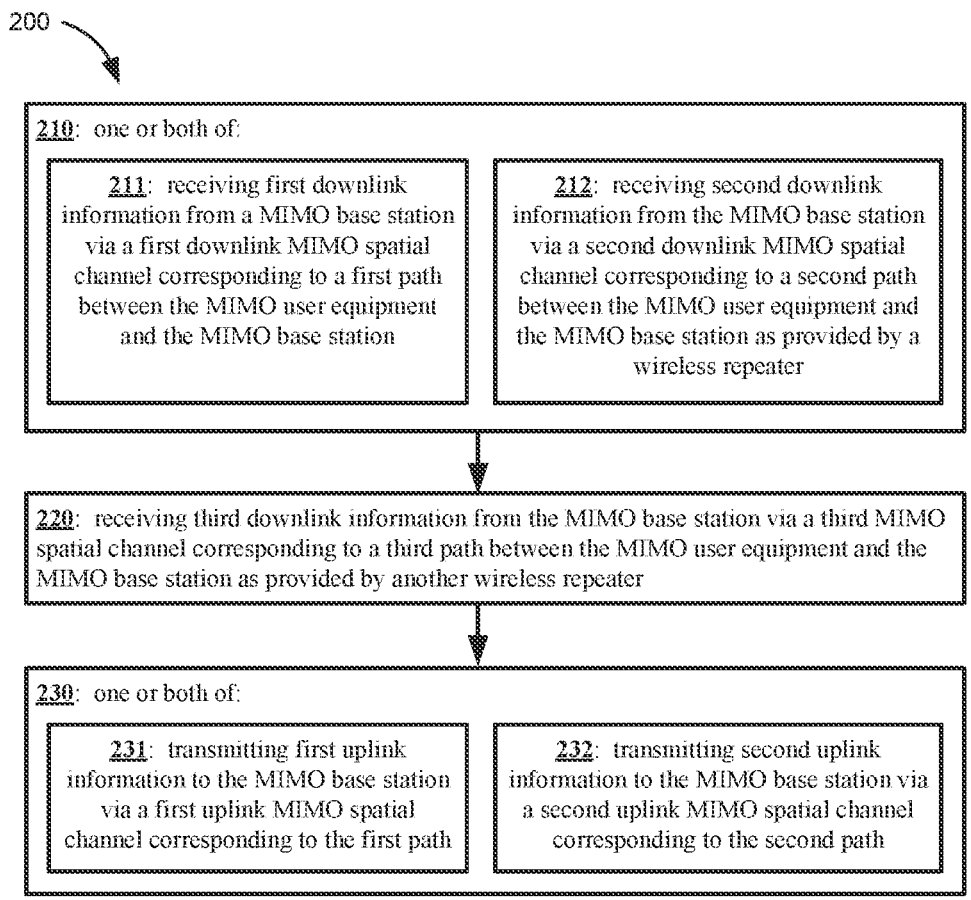
FIGS. 2-4 depict process flows.

With reference now to FIG. 2, an illustrative embodiment is depicted as a process flow diagram. Process 200 is a process for operation of a MIMO user equipment device such as MIMO user equipment 120 or 120' in FIG. 1. Process 200 includes operation 210—performing one or both of sub-operations 211 and 212. Sub-operation 211 is receiving first downlink information from a MIMO base station via a first downlink MIMO spatial channel corresponding to a first path between the MIMO user equipment and the MIMO base station. For example, in FIG. 1, MIMO user equipment 120 can receive first downlink information via a first downlink MIMO spatial channel corresponding to first path 151. Sub-operation 212 is receiving second downlink information from the MIMO base station via a second downlink MIMO spatial channel corresponding to a second path between the MIMO user equipment and the MIMO base station as provided by a wireless repeater. For example, in FIG. 1, MIMO user equipment 120 can receive second downlink information via a second downlink MIMO spatial corresponding to the second path 152b. Alternatively, separate MIMO user equipment 120' co-located at the intersection of first path 151 and second path 152b can receive the second downlink information via the second downlink MIMO spatial channel corresponding to the second path 152b.

Process 200 optionally further includes operation 220—receiving third downlink information from the MIMO base station via a third MIMO spatial channel corresponding to a third path between the MIMO user equipment and the MIMO base station as provided by another wireless repeater.

Process 200 optionally further includes operation 230—performing one or both of sub-operations 231 and 232. Sub-operation 231 is transmitting first uplink information to the MIMO base station via a first uplink MIMO spatial channel corresponding to the first path. For example, in FIG. 1, MIMO user equipment 120 can transmit first uplink information via a first uplink MIMO spatial channel corresponding to first path 151. Sub-operation 232 is transmitting second uplink information to the MIMO base station via a second uplink MIMO spatial channel corresponding to the second path. For example, in FIG. 1, MIMO user equipment 120 can transmit second uplink information via a second uplink MIMO spatial corresponding to the second path 152b. Alternatively, separate MIMO user equipment 120' co-located at the intersection of first path 151 and second path 152b can transmit the second uplink information via the second uplink MIMO spatial channel corresponding to the second path 152b.

Figure 3:
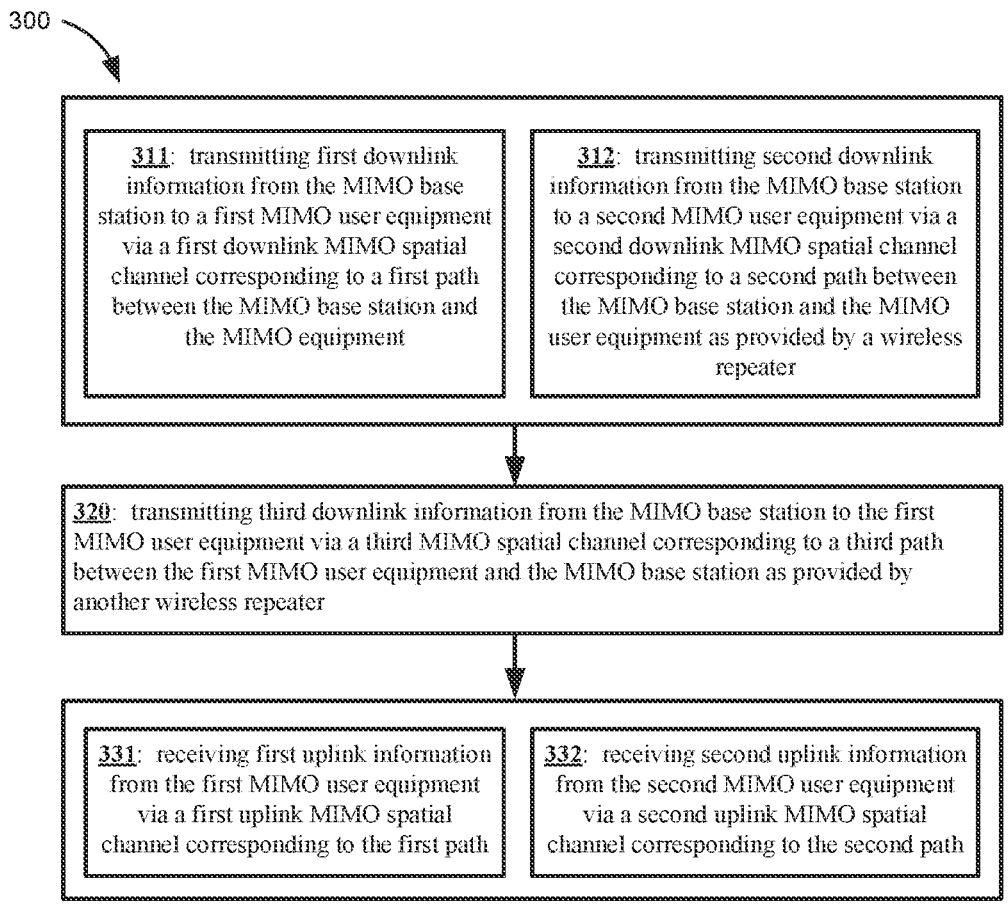

With reference now to FIG. 3, an illustrative embodiment is depicted as a process flow diagram. Process 300 is a process for operation of a MIMO base station such as MIMO base station 100 in FIG. 1. Process 300 includes operation 311— transmitting first downlink information from the MIMO base station to a first MIMO user equipment via a first downlink MIMO spatial channel corresponding to a first path between the MIMO base station and the MIMO equipment. For example, in FIG. 1, MIMO base station 100 can transmit downlink information to MIMO user equipment 120 via a first downlink MIMO spatial channel corresponding to a first path 151 between the MIMO base station 100 and the MIMO user equipment 120. Process 300 further includes operation 312— transmitting second downlink information from the MIMO base station to a second MIMO user equipment via a second downlink MIMO spatial channel corresponding to a second path between the MIMO base station and the MIMO user equipment as provided by a wireless repeater. For example, in FIG. 1, MIMO base station 100 can further transmit second downlink information to the same MIMO user equipment 120 via a second downlink MIMO spatial channel corresponding to a second path 152a, 152b between the MIMO base station 100 and the MIMO user equipment 120 as provided by wireless repeater 110. Alternatively, MIMO base station 100 can transmit the second downlink information via the second downlink MIMO spatial channel corresponding to the second path 152a, 152b to a different MIMO user equipment 120' co-located at the intersection of first path 151 and second path 152b.

Process 300 optionally further includes operation 320— transmitting third downlink information from the MIMO base station to the first MIMO user equipment via a third MIMO spatial channel corresponding to a third path between the first MIMO user equipment and the MIMO base station as provided by another wireless repeater.

Process 300 optionally further includes operation 331— receiving first uplink information from the first MIMO user equipment via a first uplink MIMO spatial channel corresponding to the first path. For example, in FIG. 1, MIMO base station 100 can receive uplink information from MIMO user equipment 120 via a first uplink MIMO spatial channel corresponding to a first path 151 between the MIMO base station 100 and the MIMO user equipment 120. Process 300 optionally further includes operation 332— receiving second uplink information from the second MIMO user equipment via a second uplink MIMO spatial channel corresponding to the second path. For example, in FIG. 1, MIMO base station 100 can further receive second downlink information from the same MIMO user equipment 120 via a second downlink MIMO spatial channel corresponding to a second path 152a, 152b between the MIMO base station 100 and the MIMO user equipment 120 as provided by wireless repeater 110. Alternatively, MIMO base station 100 can receive the second uplink information via the second downlink MIMO spatial channel corresponding to the second path 152a, 152b from a different MIMO user equipment 120' co-located at the intersection of first path 151 and second path 152b.

Figure 4:
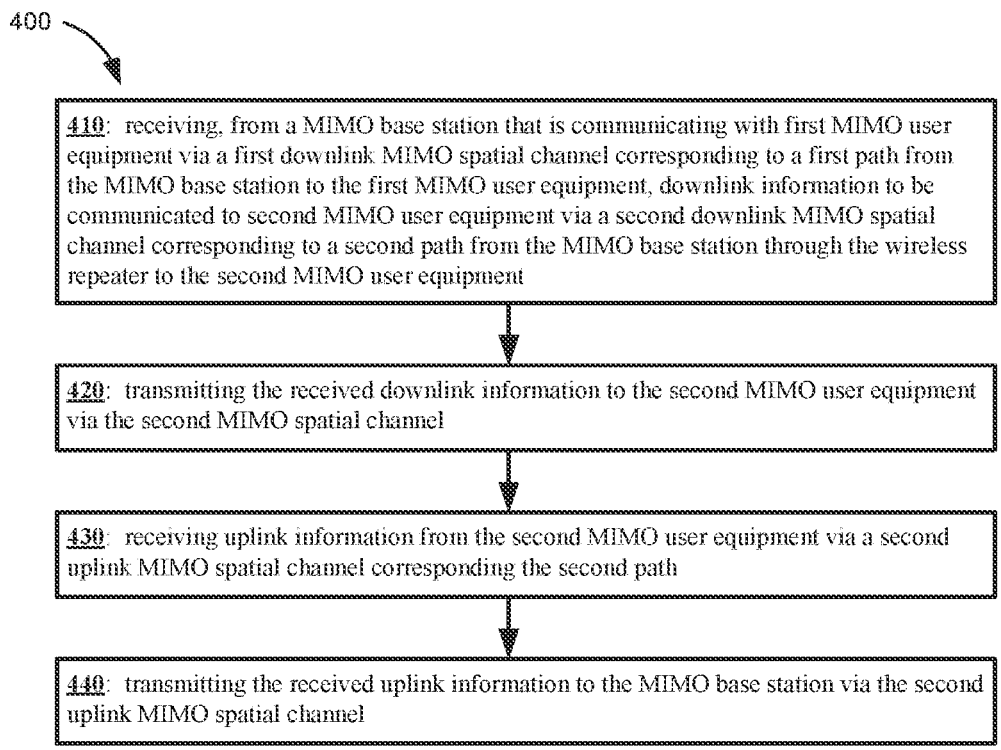

With reference now to FIG. 4, an illustrative embodiment is depicted as a process flow diagram. Process 400 is a process for operation of an RF repeater such as RF repeater 110 in FIG. 1. Process 400 includes operation 410— receiving, from a MIMO base station that is communicating with first MIMO user equipment via a first downlink MIMO spatial channel corresponding to a first path from the MIMO base station to the first MIMO user equipment, downlink information to be communicated to second MIMO user equipment via a second downlink MIMO spatial channel corresponding to a second path from the MIMO base station through the wireless repeater to the second MIMO user equipment; and operation 420— transmitting the received downlink information to the second MIMO user equipment via the second MIMO spatial channel. For example, in FIG.

1, repeater 110 can receive, from MIMO base station 100 that is communicating with MIMO user equipment 120 via a first downlink MIMO spatial channel corresponding to first path 151, downlink information to be communicated to the same MIMO user equipment 120 via a second downlink MIMO spatial channel corresponding to second path 152a, 152b. Alternatively, repeater 110 can receive, from MIMO base station 100 that is communicating with MIMO user equipment 120 via a first downlink MIMO spatial channel corresponding to first path 151, downlink information to be communicated to different MIMO user equipment 120' via the second downlink MIMO spatial channel corresponding to second path 152a, 152b, where the user equipment 120, 120' are co-located at the intersection of the first path 151 and the second path 152b.

Process 400 optionally further includes operation 430—receiving uplink information from the second MIMO user equipment via a second uplink MIMO spatial channel corresponding the second path; and operation 440— transmitting the received uplink information to the MIMO base station via the second uplink MIMO spatial channel. For example, in FIG. 1, the second MIMO user equipment can be the same MIMO user equipment 120 that is communicating with the MIMO base station via the first MIMO spatial channel corresponding to first path 121. Alternatively, in FIG. 1, the second MIMO user equipment can be different MIMO user equipment 120' that is co-located with user equipment 120 at the intersection of the first path 151 and the second path 152b.

In one or more embodiments (not shown in the figures), a computing device may include one or more embedded logic hardware devices instead of one or more CPUs, such as, an Application Specific Integrated Circuits (ASICs), Field Programmable Gate Arrays (FPGAs), Programmable Array Logics (PALs), or the like, or combination thereof. The embedded logic hardware devices may directly execute embedded logic to perform actions. Also, in one or more embodiments (not shown in the figures), the computer device may include one or more hardware microcontrollers instead of a CPU. In one or more embodiments, the one or more microcontrollers may directly execute their own embedded logic to perform actions and access their own internal or memory and their own external Input and Output Interfaces (e.g., hardware pins and/or wireless transceivers) to perform actions, such as System On a Chip (SOC), external memory, or the like. Although not shown, the internal memory and/or the external memory may include one or more computer-readable storage media (CRM) devices for storage of information such as computer-readable instructions, data structures, program modules or other data. The CRM devices may provide for transitory and/or non-transitory storage of information. Additionally, in one or more embodiments, the computational resources may be distributed over a cloud computing platform and the like.

Clauses for Various Embodiments of the Invention

1. A method of operating MIMO user equipment, comprising one or both of:
   receiving first downlink information from a MIMO base station via a first downlink MIMO spatial channel corresponding to a first path between the MIMO user equipment and the MIMO base station; and
   receiving second downlink information from the MIMO base station via a second downlink MIMO spatial channel corresponding to a second path between the MIMO user equipment and the MIMO base station as provided by a wireless repeater.
2. The method of clause 1, wherein the method includes both the receiving of the first downlink information and the receiving of the second downlink information.
3. The method of clause 1, wherein the method includes the receiving of the first downlink information and does not include the receiving of the second downlink information.
4. The method of clause 1, wherein the method includes the receiving of the second downlink information and does not include the receiving of the first downlink information.
5. The method of clause 1, wherein the first path is a line-of-sight path and the second path is a non-line-of-sight path.
6. The method of clause 1, wherein the MIMO user equipment is mobile user equipment.
7. The method of clause 1, wherein the MIMO user equipment is a fixed wireless access (FWA) terminal.
8. The method of clause 1, wherein the MIMO base station is a 5G MIMO base station.
9. The method of clause 8, wherein the 5G MIMO base station is a 5G MIMO base station operating in a 5G FR1 frequency band.
10. The method of clause 8, wherein the 5G MIMO base station is a 5G MIMO base station operating in a 5G FR2 frequency band.
11. The method of clause 1, wherein the MIMO base station is a 4G MIMO base station.
12. The method of clause 1, wherein the wireless repeater includes a donor antenna configured to receive the second downlink information from the MIMO base station and a service antenna configured to transmit the second downlink information to the MIMO user equipment.
13. The method of clause 12, wherein the donor antenna is an adjustable beamforming antenna.
14. The method of clause 13, wherein the adjustable beamforming antenna is a holographic beamforming antenna.
15. The method of clause 12, wherein the service antenna is an adjustable beamforming antenna.
16. The method of clause 15, wherein the adjustable beamforming antenna is a holographic beamforming antenna.
17. The method of clause 1, wherein:
   the MIMO user equipment includes a beamforming antenna system providing a selected angular resolution; and
   an angular separation between the first path and the second path is greater than the selected angular resolution.
18. The method of clause 17, wherein the selected angular resolution is less than 90°.
19. The method of clause 17, wherein the selected angular resolution is about 12°.
20. The method of clause 17, wherein the selected angular resolution is greater than or equal to 90°.
21. The method of clause 17, wherein the beamforming antenna system includes an array antenna having an aperture of $M\lambda \times N\lambda$, where M is greater than 1, N is greater than or equal to 1, and $\lambda$ is a wavelength corresponding to an operating frequency of the beamforming antenna system.
22. The method of clause 2, further comprising:

receiving third downlink information from the MIMO base station via a third MIMO spatial channel corresponding to a third path between the MIMO user equipment and the MIMO base station as provided by another wireless repeater.

23. The method of clause 1, further comprising one or both of:
transmitting first uplink information to the MIMO base station via a first uplink MIMO spatial channel corresponding to the first path; and
transmitting second uplink information to the MIMO base station via a second uplink MIMO spatial channel corresponding to the second path.

24. The method of clause 23, wherein the method includes both the transmitting of the first uplink information and the transmitting of the second uplink information.

25. The method of clause 23, wherein the method includes the receiving of the first uplink information and does not include the transmitting of the second uplink information.

26. The method of clause 23, wherein the method includes the transmitting of the second uplink information and does not include the transmitting of the first uplink information.

27. The method of clause 23, wherein the first uplink MIMO spatial channel is equal to the first downlink MIMO spatial channel and the second uplink MIMO spatial channel is equal to the second downlink MIMO spatial channel.

28. A MIMO user equipment, comprising:
one or more processors coupled to one or more memories having instructions stored thereon to cause the MIMO user equipment to carry out the method of any of clauses 1-27.

29. A computer-readable medium storing instructions to cause a MIMO user equipment to carry out the method of any of clauses 1-27.

30. A method of operating a MIMO base station, comprising:
transmitting first downlink information from the MIMO base station to a first MIMO user equipment via a first downlink MIMO spatial channel corresponding to a first path between the MIMO base station and the MIMO equipment; and
transmitting second downlink information from the MIMO base station to a second MIMO user equipment via a second downlink MIMO spatial channel corresponding to a second path between the MIMO base station and the MIMO user equipment as provided by a wireless repeater.

31. The method of clause 30, wherein the second MIMO user equipment is the first MIMO user equipment.

32. The method of clause 30, wherein the first MIMO user equipment and the second MIMO user equipment are different MIMO user equipment co-located at an intersection of the first path and the second path.

33. The method of clause 30, wherein the first path is a line-of-sight path and the second path is a non-line-of-sight path.

34. The method of clause 30, wherein the first or second MIMO user equipment is mobile user equipment.

35. The method of clause 30, wherein the first or second MIMO user equipment is a fixed wireless access (FWA) terminal.

36. The method of clause 30, wherein the MIMO base station is a 5G MIMO base station.

37. The method of clause 36, wherein the 5G MIMO base station is a 5G MIMO base station operating in a 5G FR1 frequency band.

38. The method of clause 36, wherein the 5G MIMO base station is a 5G MIMO base station operating in a 5G FR2 frequency band.

39. The method of clause 30, wherein the MIMO base station is a 4G MIMO base station.

40. The method of clause 30, wherein:
the MIMO base station includes a beamforming antenna system providing a selected angular resolution; and
an angular separation between the first path and the second path is greater than the selected angular resolution.

41. The method of clause 40, wherein the selected angular resolution is less than or equal to 30°.

42. The method of clause 40, wherein the selected angular resolution is less than or equal to 15°.

43. The method of clause 40, wherein the selected angular resolution is less than or equal to 5°.

44. The method of clause 40, wherein the beamforming antenna system includes an array antenna having an aperture of $M\lambda \times N\lambda$, where M is greater than 1, N is greater than or equal to 1, and $\lambda$ is a wavelength corresponding to an operating frequency of the beamforming antenna system.

45. The method of clause 30, wherein the wireless repeater includes a donor antenna configured to receive the second downlink information from the MIMO base station and a service antenna configured to transmit the second downlink information to the second MIMO user equipment.

46. The method of clause 45, wherein the donor antenna is an adjustable beamforming antenna.

47. The method of clause 46, wherein the adjustable beamforming antenna is a holographic beamforming antenna.

48. The method of clause 45, wherein the service antenna is an adjustable beamforming antenna.

49. The method of clause 48, wherein the adjustable beamforming antenna is a holographic beamforming antenna.

50. The method of clause 30, further comprising:
transmitting third downlink information from the MIMO base station to the first MIMO user equipment via a third MIMO spatial channel corresponding to a third path between the first MIMO user equipment and the MIMO base station as provided by another wireless repeater.

51. The method of clause 30, further comprising:
receiving first uplink information from the first MIMO user equipment via a first uplink MIMO spatial channel corresponding to the first path; and
receiving second uplink information from the second MIMO user equipment via a second uplink MIMO spatial channel corresponding to the second path.

52. The method of clause 51, wherein the second MIMO user equipment is the first MIMO user equipment.

53. The method of clause 51, wherein the first MIMO user equipment and the second MIMO user equipment are different MIMO user equipment co-located at an intersection of the first path and the second path.

54. The method of clause 51, wherein the first uplink MIMO spatial channel is equal to the first downlink MIMO spatial channel and the second uplink MIMO spatial channel is equal to the second downlink MIMO spatial channel.

55. A MIMO base station, comprising:
  one or more processors coupled to one or more memories having instructions stored thereon to cause the MIMO base station to carry out the method of any of clauses 30-54.

56. A computer-readable medium storing instructions to cause a MIMO base station to carry out the method of any of clauses 30-54.

What is claimed as new and desired to be protected by Letters Patent of the United States is:

1. A method of operating a wireless repeater, comprising:
  receiving, from a MIMO base station that is simultaneously communicating with MIMO user equipment device via a first downlink MIMO spatial channel corresponding to a first path from the MIMO base station to the MIMO user equipment device, downlink information to be simultaneously communicated to the MIMO user equipment device via a second downlink MIMO spatial channel corresponding to a second path from the MIMO base station through the wireless repeater to the MIMO user equipment device;
  transmitting the received downlink information to the MIMO user equipment device via the second downlink MIMO spatial channel; and
  wherein the first and the second downlink MIMO spatial channels correspond to first and second MIMO spatial layers for MIMO communication between the MIMO base station and the MIMO user equipment device; and
  wherein the wireless repeater is unincluded in the first path and the wireless repeater is included in the second path.

2. The method of claim 1, wherein the first path is a line-of-sight path and the second path is a non-line-of-sight path.

3. The method of claim 1, wherein the MIMO user equipment device is mobile user equipment.

4. The method of claim 1, wherein the MIMO user equipment device is a fixed wireless access (FWA) terminal.

5. The method of claim 1, wherein the MIMO base station is a 5G MIMO base station.

6. The method of claim 5, wherein the 5G MIMO base station is a 5G MIMO base station operating in a 5G FR1 frequency band.

7. The method of claim 5, wherein the 5G MIMO base station is a 5G MIMO base station operating in a 5G FR2 frequency band.

8. The method of claim 1, wherein the MIMO base station is a 4G MIMO base station.

9. The method of claim 1, wherein the wireless repeater includes a downlink donor antenna configured to receive the downlink information from the MIMO base station and a downlink service antenna configured to transmit the downlink information to the MIMO user equipment device.

10. The method of claim 9, wherein the downlink donor antenna is an adjustable beamforming antenna.

11. The method of claim 10, wherein the adjustable beamforming antenna is a holographic beamforming antenna.

12. The method of claim 9, wherein the downlink service antenna is an adjustable beamforming antenna.

13. The method of claim 12, wherein the adjustable beamforming antenna is a holographic beamforming antenna.

14. The method of claim 1, wherein the MIMO user equipment device is communicating with the MIMO base station via a first uplink MIMO spatial channel corresponding to the first path, and the method further comprises:
  receiving uplink information from the MIMO user equipment device via a second uplink MIMO spatial channel corresponding to the second path; and
  transmitting the received uplink information to the MIMO base station via the second uplink MIMO spatial channel.

15. The method of claim 14, wherein the first uplink MIMO spatial channel is equal to the first downlink MIMO spatial channel and the second uplink MIMO spatial channel is equal to the second downlink MIMO spatial channel.

16. The method of claim 14, wherein the wireless repeater includes an uplink service antenna configured to receive the uplink information from the MIMO user equipment device and an uplink donor antenna configured to transmit the uplink information to the MIMO base station.

17. The method of claim 16, wherein the uplink donor antenna is an adjustable beamforming antenna.

18. The method of claim 17, wherein the adjustable beamforming antenna is a holographic beamforming antenna.

19. The method of claim 16, wherein the uplink service antenna is an adjustable beamforming antenna.

20. The method of claim 19, wherein the adjustable beamforming antenna is a holographic beamforming antenna.

21. A wireless repeater, comprising:
  one or more processors coupled to one or more memories having instructions stored thereon that are configured to cause the wireless repeater to carry out the method of operating a MIMO user equipment device, including:
  receiving downlink information from a MIMO base station that is simultaneously communicating with the MIMO user equipment device via a first downlink MIMO spatial channel corresponding to a first path between the MIMO user equipment device and the MIMO base station, wherein the downlink information from the MIMO base station is simultaneously communicated with the MIMO user equipment device via a second downlink MIMO spatial channel corresponding to a second path between the MIMO user equipment device and the MIMO base station as provided by a wireless repeater;
  wherein the first and the second downlink MIMO spatial channels correspond to first and second MIMO spatial layers for MIMO communication between the MIMO base station and the MIMO user equipment device; and
  wherein the wireless repeater is unincluded in the first path and the wireless repeater is included in the second path.

22. A computer-readable non-transitory medium storing instructions to cause a wireless repeater to carry out the method of operating a MIMO user equipment device, comprising:
  receiving downlink information from a MIMO base station that is simultaneously communicating with the MIMO user equipment device via a first downlink MIMO spatial channel corresponding to a first path between the MIMO user equipment device and the MIMO base station, wherein the downlink information from the MIMO base station is simultaneously communicated with the MIMO user equipment device via a second downlink MIMO spatial channel corresponding to a second path between the MIMO user equipment device and the MIMO base station as provided by a wireless repeater;

wherein the first and the second downlink MIMO spatial channels correspond to first and second MIMO spatial layers for MIMO communication between the MIMO base station and the MIMO user equipment device; and wherein the wireless repeater is unincluded in the first path and the wireless repeater is included in the second path.

* * * * *